US009569275B2

(12) United States Patent
Clay et al.

(10) Patent No.: US 9,569,275 B2
(45) Date of Patent: Feb. 14, 2017

(54) ALLOCATION AND RESERVATION OF VIRTUALIZATION-BASED RESOURCES

(75) Inventors: Steven D. Clay, Pflugerville, TX (US); Barry P. Gower, Poughkeepsie, NY (US); Jose I. Ortiz, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 13/470,371

(22) Filed: May 14, 2012

(65) Prior Publication Data

US 2013/0304923 A1 Nov. 14, 2013

(51) Int. Cl.
| | | |
|---|---|---|
| G06F 15/173 | (2006.01) | |
| G06F 9/50 | (2006.01) | |
| H04L 29/08 | (2006.01) | |
| G06F 9/455 | (2006.01) | |
| H04L 29/06 | (2006.01) | |

(52) U.S. Cl.
CPC ......... *G06F 9/5077* (2013.01); *G06F 9/45533* (2013.01); *G06F 9/45545* (2013.01); *G06F 9/45558* (2013.01); *G06F 9/5027* (2013.01); *H04L 29/06* (2013.01); *H04L 29/08144* (2013.01); *G06F 2009/4557* (2013.01); *G06F 2009/45583* (2013.01); *G06F 2209/5011* (2013.01); *G06F 2209/5014* (2013.01)

(58) Field of Classification Search
CPC .................. H04L 29/06; G06F 9/45558; G06F 2009/45583; G06F 9/45533; G06F 9/45545; G06F 2009/4557
USPC ........................................................ 709/226
See application file for complete search history.

(56) References Cited

U.S. PATENT DOCUMENTS

| | | | | |
|---|---|---|---|---|
| 6,115,382 | A | * | 9/2000 | Abe ........................... 370/395.3 |
| 8,078,728 | B1 | | 12/2011 | Pollan et al. |
| 8,321,871 | B1 | * | 11/2012 | Jackson ........................ 718/104 |
| 2003/0065782 | A1 | * | 4/2003 | Nishanov et al. ............ 709/226 |
| 2006/0050862 | A1 | * | 3/2006 | Shen .................... H04L 12/2856 379/219 |
| 2006/0155563 | A1 | * | 7/2006 | Banerjee et al. ................. 705/1 |
| 2008/0279167 | A1 | * | 11/2008 | Cardei .................. H04W 28/26 370/342 |
| 2010/0074107 | A1 | * | 3/2010 | Tyagi et al. .................... 370/229 |
| 2010/0169454 | A1 | * | 7/2010 | Tanimura et al. ............ 709/217 |
| 2010/0306378 | A1 | * | 12/2010 | Christenson et al. ........ 709/226 |

(Continued)

OTHER PUBLICATIONS

Buyya, Cloud Computing and Emerging IT Platforms: Vision, Hype, and Reality for Delivering Computing as the 5th Utility Article in Future Generation Computer Systems • Jun. 2009.*

*Primary Examiner* — Chris Parry
*Assistant Examiner* — Weiwei Stiltner
(74) *Attorney, Agent, or Firm* — James L. Baudino

(57) ABSTRACT

According to one aspect of the present disclosure a method and technique for allocating and reserving virtualization-based resources is disclosed. The method includes: receiving, by a virtualization-based resource management system, a reservation request to reserve a set of computing resources; dynamically allocating the set of computing resources to the reservation request; assigning a key to the allocated set of computing resources; and maintaining the allocated set of computing resources in a reserved state until a utilization request is received to utilize the allocated set of computing resources, the utilization request including the key.

17 Claims, 5 Drawing Sheets

(56) References Cited

U.S. PATENT DOCUMENTS

| | | |
|---|---|---|
| 2011/0016214 A1* | 1/2011 | Jackson ................. 709/226 |
| 2011/0041066 A1* | 2/2011 | Kimmet ................. 715/736 |
| 2011/0258323 A1 | 10/2011 | Jackson |
| 2012/0011358 A1 | 1/2012 | Masone |
| 2013/0039340 A1* | 2/2013 | Lappetelainen et al. ..... 370/331 |
| 2013/0260809 A1* | 10/2013 | Nentwig ................. 455/502 |

* cited by examiner

ALLOCATION AND RESERVATION OF VIRTUALIZATION-BASED RESOURCES

BACKGROUND

The cloud computing environment is an infrastructure level virtualization of computing resources that enables such resources or disparate devices appear to an end-user or customer as a single pool of seamless resources. These resources may include such things as physical or logical compute engines, servers and devices, device memory, storage devices, etc. A cloud service provider may support resource level virtualization to provide computing resources as virtualized resources to cloud customers. In operation, a user can request computing resources from the cloud service provider. The cloud user then logs into the provided virtualized resources and deploys its applications. Thus, the user may make use of the virtualized resources without needing to own or manage the physical level resources.

BRIEF SUMMARY

According to one aspect of the present disclosure a method and technique for allocating and reserving virtualization-based resources is disclosed. The method includes: receiving, by a virtualization-based resource management system, a reservation request to reserve a set of computing resources; dynamically allocating the set of computing resources to the reservation request; assigning a key to the allocated set of computing resources; and maintaining the allocated set of computing resources in a reserved state until a utilization request is received to utilize the allocated set of computing resources, the utilization request including the key.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
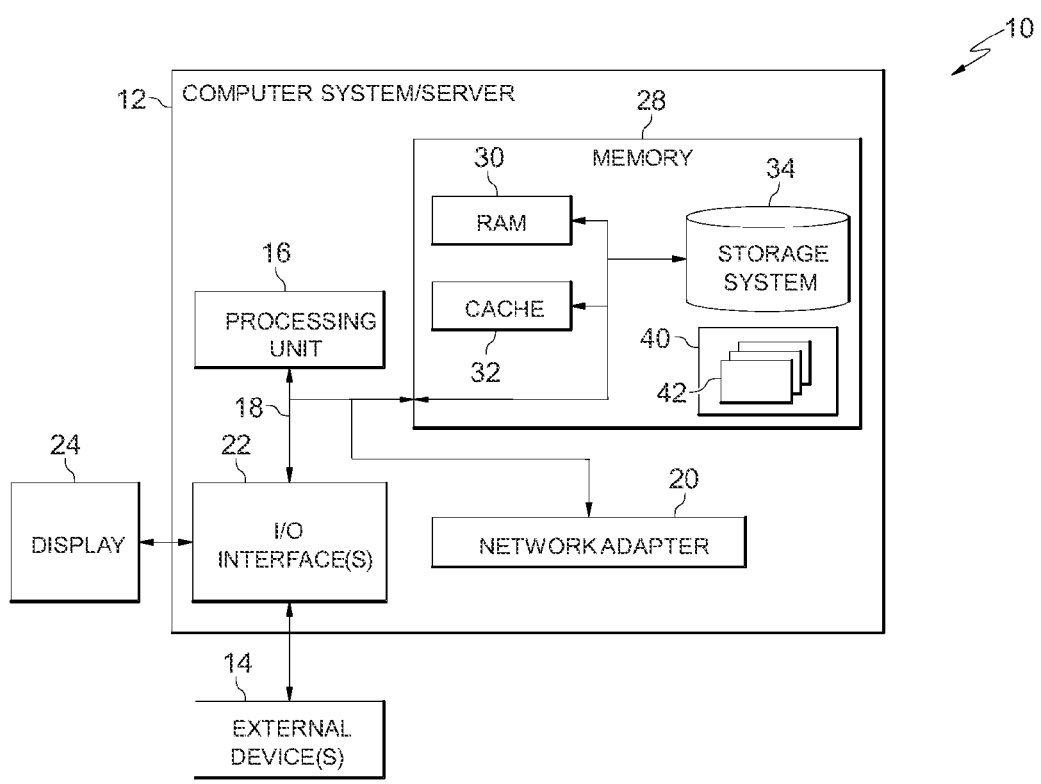
FIG. 1 depicts a cloud computing node according to an embodiment of the present invention.

Embodiments of the present disclosure provide a method, system and computer program product for managing and reserving virtualization-based resources. For example, in some embodiments, the method and technique includes: receiving, by a virtualization-based resource management system, a reservation request to reserve a set of computing resources; dynamically allocating the set of computing resources to the reservation request; assigning a key to the allocated set of computing resources; and maintaining the allocated set of computing resources in a reserved state until a utilization request is received to utilize the allocated set of computing resources, the utilization request including the key. Thus, embodiments of the present disclosure enable virtualization-based cloud computing resources to be reserved in advance of the utilization and/or deployment of such cloud computing resources. In some embodiments, a unique key or identifier is assigned to the reserved set of resources and is used to identify, access, use and/or release the reserved set of cloud computing resources. For example, to access, utilize and/or release a reserved set of cloud computing resources, the corresponding request to access, utilize and/or release a reserved set of cloud computing resources would include the respective key/identifier. Thus, embodiments of the present disclosure enable a cloud customer (or multiple cloud customers) to utilize the same resources previously reserved using the corresponding key/identifier. Further, configuration information corresponding to the reserved set of cloud computing resources may be obtained by the cloud customer in advance of the utilization and deployment of such cloud computing resources.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
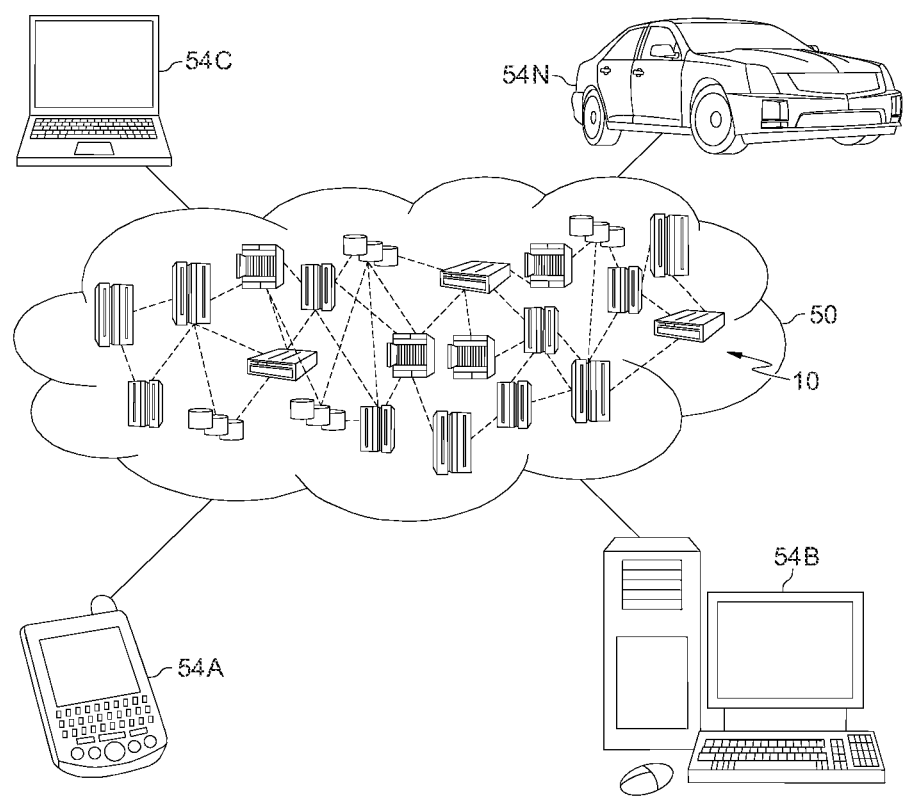
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
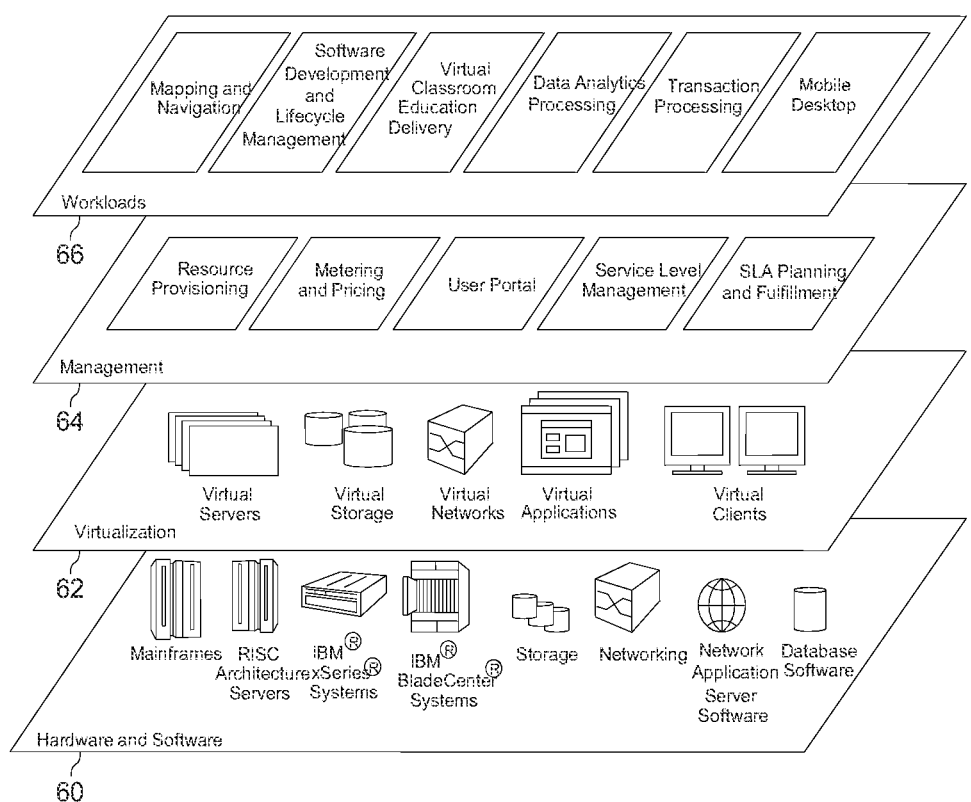
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual machines, including virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management may also include virtual machine allocation and management such that the migration and/or execution of virtual machine resources (e.g., various workload or application processing) complies with the geophysical host location.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop functions.

Figure 4:
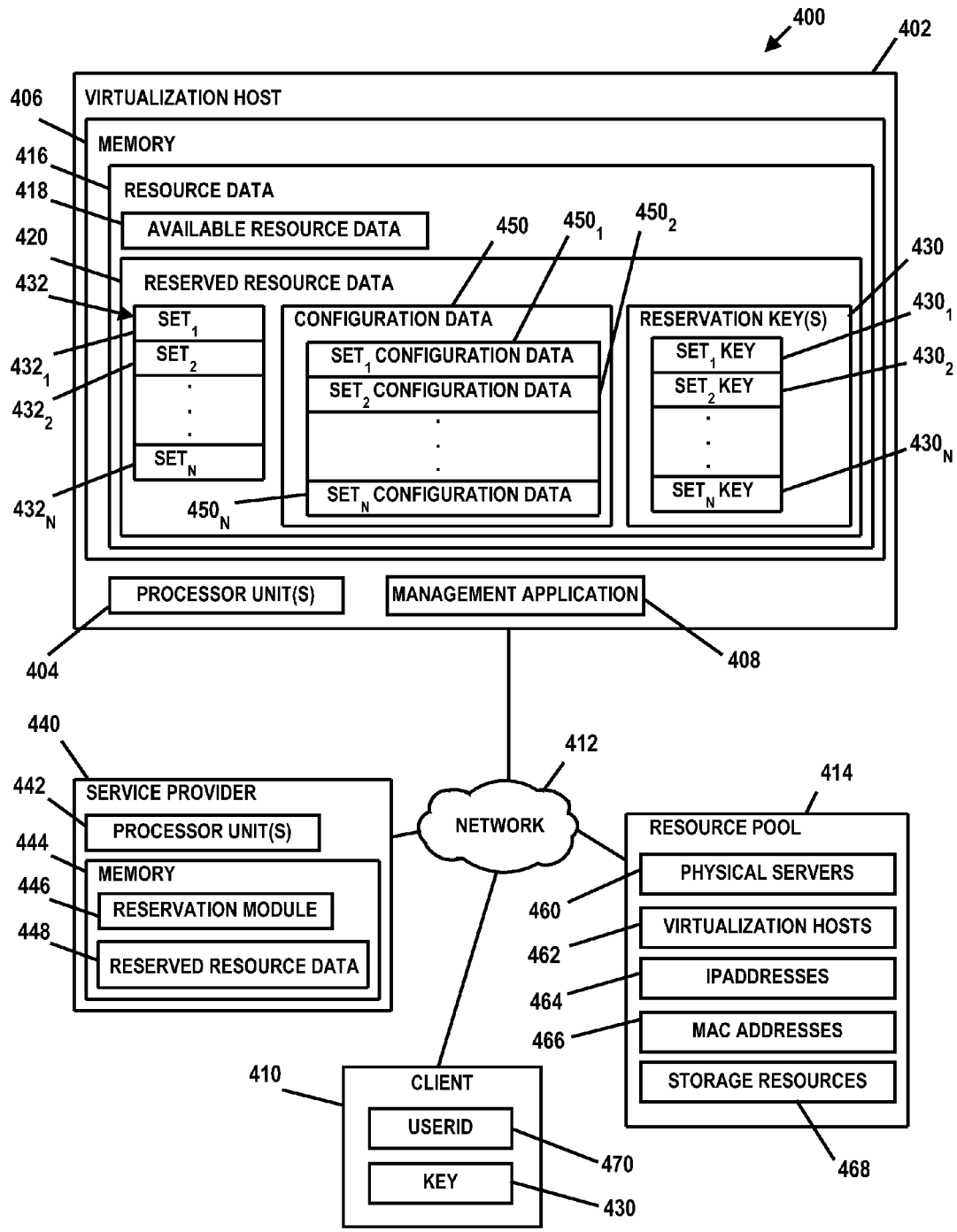
FIG. 4 depicts an embodiment of a data processing system in which illustrative embodiments of a system for managing and reserving virtualization-based resources may be implemented.

FIG. 4 is an illustrative embodiment of a virtualization-based resource management system 400 for managing and reserving virtualization-based resources in a cloud or other type of computing environment. System 400 may be implemented on data processing systems or platforms such as, but not limited to, node 10 or at other data processing system locations. System 400 (e.g., all or portions thereof) may be implemented, for example, on hardware and software layer 60 and/or on management layer 64 as depicted in FIG. 3. In the embodiment illustrated in FIG. 4, system 400 comprises a host 402 comprising a physical computer or any type of data processing platform. Host 402 includes one or more processor units 404 (e.g., CPU) capable of reading and executing instructions and/or running a variety of types of applications and a memory 406. In FIG. 4, memory 406 comprises a management application 408 for dynamically allocating virtualization-based resources in a cloud or other type of computing environment to a cloud consumer or client 410. For example, in FIG. 4, host 402 can communicate over a network 412 to dynamically allocate (e.g., an on-demand allocation) for various types of computing resources described and/or made available via a resource pool 414. Resource pool 414 may include a variety of types of computing resources such as, but not limited to, storage resources, memory resources, processing power resources, and networking resources. Management application 408 may be implemented in any suitable manner that may be hardware-based, software-based, or some combination of both. For example, management application 408 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, memory also comprises resource data for 416 comprising information associated with various computing resources that may be allocated and/or reserved for a resource request such as various computing resources available from resource pool 414. In the embodiment illustrated in FIG. 4, resource data 416 comprises available resource data 418 and reserved resource data 420. Available resource data 418 comprises information associated with computing resources available from resource pool 414 that may be allocated to a request for resources, and reserved resource data 420 comprises information associated with computing resources of resource pool 414 that have been allocated and/or otherwise reserved in response to an allocation and/or reservation request. For example, in some embodiments, management application 408 is configured to enable certain computing resources to be allocated and reserved prior to the utilization of such resources (even though such resources may not be immediately deployed and/or utilized). Thus, in operation, in response to receiving a reservation request for certain computing resources, management application 408 accesses available resource data 418 and sets aside and/or otherwise reserves certain resources to fulfill the reservation request. The reserved resources are defined and/or otherwise identified by reserved resource data 420.

In the embodiment illustrated in FIG. 4, reserved resource data 420 includes one or more reservation keys 430 that are assigned and/or otherwise correspond to a particular set of reserved resources. For example, in the embodiment illustrated in FIG. 4, a particular set 432 of reserved resources, which may include certain memory capacity resources, processor resources, data storage resources, networking resources, etc., is assigned a particular reservation key 430. In FIG. 4, the various sets 432 of reserved resources are identified as $set_1$ $432_1$, $set_2$ $432_2$, through $set_n$ $432_n$. Correspondingly, reservation keys 430 includes a key for each set 432 of reserved resources (key $430_1$ for $set_1$ $432_1$, key $430_2$ for $set_2$ $432_2$, etc.). In some embodiments, management application 408 is configured to generate and/or otherwise derive a key 430 to assign to a particular set 432 of reserved resources (e.g., randomly generated, selected from a pool of keys, etc.). However, in some embodiments, management application 408 may receive a designation of a key for 30 to assign to a particular set 432 of reserved resources. For example, in FIG. 4, a service provider 440 is illustrated which may comprise an entity providing cloud computing as a service to its cloud customers or clients 410. Service provider 440 may include one or more processor units 442 and a memory 444. In the illustrated embodiment, memory 444 includes a reservation module 446 and reserved resource data 448. Reservation module 446 may be configured to provide an interface to enable a cloud customer or client 410 to request an allocation of cloud computing resources from service provider 440. Reservation module 446 may be further configured to interface with host 402 to request the allocation of various computing resources as requested by cloud client 410. In some embodiments, reservation module 446 may be configured to generate and/or otherwise derive a particular key to be assigned to a reserved set 432 of computing resources on behalf of the cloud customer or client 410 (e.g., randomly generated, selected from a pool of keys, etc.). Thus, in this embodiment, service provider 440 would provide the key 430 to host 402 for assignment of such key 430 to the corresponding set 432 of reserved resources by management application 408. In yet other embodiments, the cloud customer or client 410 may designate a particular key 430 to be used for a particular set 432 of reserved resources (e.g., providing the key 430 to service provider 440 or directly to host 402 to be used by management application 408 to assign to the set 432 of reserved cloud computing resources). In some embodiments, the cloud customer or client 410 may interact with service provider 442 to obtain an allocation of cloud resources; however, it should be understood that in some embodiments, the cloud customer or client 410 may interface directly with host 402. Reservation module 446 may be implemented in any suitable manner that may be hardware-based, software-based, or some combination of both. For example, reservation module 446 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, reserved resource data 420 also includes configuration data 450. Configuration data 450 may comprise various types of information corresponding to the reserved set 432 of computing resources. For example, in FIG. 4, resource pool 414 includes various types of computing resources such as physical servers 460, the virtualization hosts 462, Internet protocol (IP) addresses 464, media access control (MAC) addresses 466, and storage resources 468. It should be understood that resource pool 414 may comprise additional and/or different types of computing resources besides those illustrated in FIG. 4. Configuration data 450 may comprise various types of configuration information associated with the resources allocated and reserved for a particular set 432 of reserved resources. For example, in FIG. 4, configuration data 450 includes $set_1$ configuration data $450_1$ corresponding to $set_1$ $432_1$, $set_2$ configuration data $450_2$ corresponding to $set_2$ $432_2$, etc. in some embodiments, configuration data 450 corresponding to a particular set 432 of reserved resources is communicated by management application 408 to service provider 440 and/or cloud client 410. For example, $set_1$ configuration data $450_1$ may comprise IP addresses 464, server 460 attributes, storage resource 468 information, or other types of computing resources attribute information that may be desired and/or needed by cloud client 410 prior to utilization of the cloud resources. In some embodiments, if service provider 440 is used to provide cloud services to cloud client 410, service provider 440 may store the corresponding configuration data as reserved resource data 448. The configuration data 450 may also be provided directly to cloud client 410.

In operation, a particular cloud customer or client 410 may initiate a reservation request, directly to host 402 or via service provider 440, to reserve certain cloud computing resources. The reservation request may set forth certain requested resources such as processor capabilities, memory capacity requirements, storage requirements, a quantity of IP addresses, etc. The reservation request may also specify or request that certain configuration data be returned to the requestor (e.g., service provider 440 or client 410) such as the server or processor capabilities allocated to the request, the identification of certain IP addresses reserved for various network resources, etc. The reservation request may include a userid 470 or other type of personal identifier unique to the cloud customer or client 410 (e.g., a username, password, etc.) and the key 430 to be used by host 402 for assigning to the reserved set of cloud computing resources (e.g., key $430_1$). In response to receiving the reservation request, management application 408 accesses available resource data 418 corresponding to resource pool 414 and dynamically allocates, sets aside and/or otherwise reserves certain cloud computing resources to fulfill the reservation request. The allocated and reserved set 432 of cloud computing resources fulfilling the request are assigned the particular reservation key 430 received with the reservation request such that the particular reservation key 430 is correlated to the corresponding set 432 of reserved computing resources. As described above, if a reservation key 430 is not included in the reservation request, management application 408 may automatically generate, select and/or derive a key 430 to assign to the reserved set 432 of allocated resources.

Management application 408 may store various types of configuration data 450 corresponding to the reserved set 432 of resources and forward such configuration data 450 to service provider 440 and/or client 410. Further, if management application 408 generated and/or derived a particular key 430 that was assigned to the reserved set 432 of resources, management application 408 may communicate the corresponding key 432 to service provider 440 and/or client 410. Management application 408 maintains the reserved set 432 of allocated resources in a reserved state even though the allocated resources may not be currently utilized or active. For example, as described above, client 410 may need various types of configuration information corresponding to the reserved set of computing resources prior to deploying an application to the cloud computing resources (e.g., IP addresses, memory capacity information, etc.).

To utilize the reserved set 432 of cloud computing resources, client 410, directly or via service provider 440, submits a utilization request to host 402 along with the particular key 430 assigned to the corresponding set 432 of reserved cloud computing resources. The particular key 430 is used by management application 408 to verify that the utilization request has been received by a valid user of the reserved cloud computing resources. According to the present disclosure, the key 430 is a separate and distinct identifier other than a username or other personal identifier corresponding to a particular user of the cloud computing resources (e.g., userid 470) such that a number of different users may utilize the same set 432 of allocated resources by submitting the corresponding assigned key 430. Thus, in response to receiving a utilization request, management application 408 identifies the submitted key 430 accompanying the utilization request and authenticates the submitted key 430 as a valid key corresponding to a reserved set 432 of computing resources. In response to validating the received key 430 accompanying the utilization request, management application 408 enables use of the corresponding reserved set 432 of computing resources for the utilization request.

In some embodiments, management application 408 is configured to maintain a reserved set 432 of cloud computing resources in a reserved state even though the corresponding set 432 of cloud computing resources is in an active state or currently unutilized. For example, in response to a cloud customer or client 410 taking down and/or otherwise discontinuing a particular application from the cloud resource environment (e.g., due to maintenance or other purposes) or prior to an initial use of the reserved cloud computing resources, management application 408 maintains the corresponding set 432 of computing resources in a reserved state until later utilized or released. In some embodiments, management application 408 is configured to maintain the particular set 432 of reserved computing resources in a reserved state until either a utilization request is received (an initial request or a request subsequent to an inactive state of the computing resources) or a release request is received enabling host 402 to release the reserved set 432 of computing resources for other users/purposes. In some embodiments, and to enable a release of a particular set 432 of computing resources, a release request accompanied by the corresponding key 430 is submitted by cloud customer or client 410, either directly or via service provider 440, to host 402. In response to receiving a release request, management application 408 validates the particular reservation key 430 received with the release request as corresponding to a particular set 432 of computing resources. In response to validating the received key 430, management application 408 proceeds to release the respective set 432 of cloud computing resources (e.g., un-reserving and/or otherwise releasing the previously reserved cloud computing resources for allocation to another user/entity).

Figure 5:
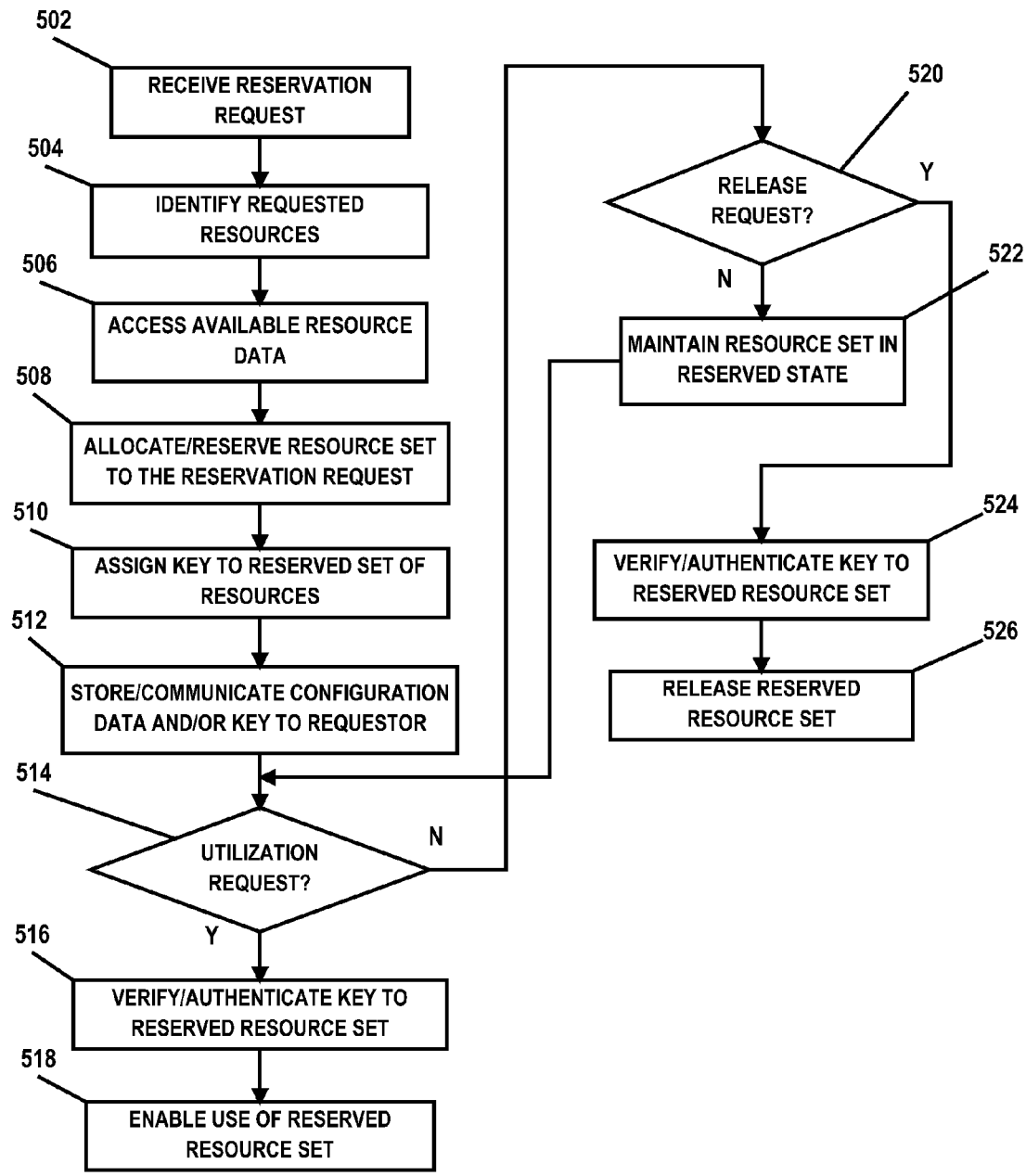
FIG. 5 depicts a flow diagram illustrating an embodiment of a method for managing and reserving virtualization-based resources according to the present disclosure.

FIG. 5 is a flow diagram illustrating an embodiment of a method for managing and reserving virtualization-based resources. The method begins at block 502, where management application 408 receives a reservation request from a requestor (e.g., directly from a cloud customer or client 410 or via service provider 440) for cloud computing resources. At block 504, management application 408 identifies and/or otherwise determines the particular cloud computing resources identified by the reservation request. At block 506, management application 408 accesses available resource data 418. At block 508, management application 408 allocates and/or otherwise reserves a set of cloud computing resources from resource pool 414 to the reservation request. At block 510, management application 408 assigns a key 430 to the reserved set 432 of cloud computing resources. As described above, in some embodiments, host 402 may receive a key to assign to the reserved set of cloud computing resources from client 410 or service provider 440 (e.g., included in the reservation request and/or otherwise provided or set forth by client 410 or service provider 440). In this case, management application 408 assigns the received key 430 to the reserved set 432 of cloud computing resources. In some embodiments, if a key to assign to the reserved set 432 of cloud computing resources is not received from client 410 or service provider 440, management application 408 generates and/or otherwise selects a key 430 to assign to the set of reserved cloud computing resources.

At block 512, management application 408 stores configuration data 450 corresponding to the reserved set 432 of cloud computing resources and communicates such configuration data 450 to client 410 and/or service provider 440. Management application 408 may also communicate the particular key 430 assigned to the corresponding set 432 of reserved cloud computing resources to client 410 and/or service provider 440. For example, if management application 408 generates the particular key 430 for the set 432 of reserved cloud computing resources, management application 408 communicates and/or otherwise provides such key 430 to client 410 or service provider 440. Further, if the key 430 to assign to the reserved set 432 of resources is submitted by service provider 440 to host 402 (e.g., generated and/or selected by service provider 440 and submitted to host 402 with the reservation request), service provider 440 may confirm and/or otherwise notify client 410 of the key 430 assigned to the reserved set 432 of resources. Additionally, even if the key 43o to assign the reserved set 432 of resources is selected and/or provided by client 410 or service provider 440, management application 408 may be configured to communicate and/or provide confirmation of the use of such key 430 for the reservation.

At decisional block 514, a determination is made whether a utilization request has been received by virtualization host 402 for cloud computing resources. If not, the method proceeds to decisional block 520. If a utilization request has been received at block 514, the method proceeds to block 516, where management application 408 verifies in/or otherwise authenticates the key 430 accompanying the utilization request to a reserved resource set 432. In response to verifying and/or otherwise authenticating the received key 430, the method proceeds to block 518, where management application 408 enables use of the reserved set 432 of cloud computing resources. At decisional block 520, a determination is made whether a release request has been received by virtualization host 402. If not, the method proceeds to block 522, where management application 408 maintains the set 432 of cloud computing resources in a reserved state. Thus, prior to utilization of the reserved cloud computing resources, or during nonuse of the reserved cloud computing resources, management application 408 maintains the reserved set 432 of cloud computing resources in a reserved state. If a release request is received at decisional block 520, the method proceeds to block 524, where management application 408 verifies and/or otherwise authenticates the key 430 accompanying the release request to a corresponding reserved set 432 of reserved cloud computing resources. In response to verifying and/or otherwise authenticating the received key 430, the method proceeds to block 526, where management application 408 releases the reserved set of computing resources.

Thus, embodiments of the present disclosure enable virtualization-based cloud computing resources to be reserved in advance of the utilization and/or deployment of such cloud computing resources. For example, in some embodiments, a unique identifier or key 430 is assigned to the reserved set of resources and is used to identify, access, use and/or release the reserved set of cloud computing resources. To access, utilize and/or release a reserved set of cloud computing resources, the corresponding request to access, utilize and/or release a reserved set of cloud computing resources would include the respective key/identifier, thereby enabling a cloud customer (or multiple cloud customers) to utilize the same resources previously reserved using the corresponding key/identifier. Further, embodiments of the present disclosure enable a cloud customer to obtain configuration information corresponding to the reserved set of cloud computing resources in advance of the utilization and deployment of such cloud computing resources, thereby enabling the cloud customer to pre-configure the application/resources that will be utilizing the reserved set of cloud computing resources.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    receiving, by a virtualization-based resource management system, a reservation request generated by a first requestor to reserve a set of computing resources, the reservation request including a userid of the first requestor and a request to reserve an IP address for use by an application to be deployed and hosted by the set of computing resources, the reservation request further including a request to return configuration data corresponding to the set of computing resources to the first requestor, the requested configuration data including the IP address;
    dynamically allocating the set of computing resources to the reservation request including the IP address;
    determining, by the virtualization-based resource management system,
    whether the request includes a key;
    if the request did not include a key, generating and assigning, by the virtualization-based resource management system, a key to the allocated set of computing resources;
    maintaining the allocated set of computing resources in a reserved state;
    storing the key and the corresponding allocated set of computing resources as reserved resource data;
    providing the key and the corresponding allocated set of computing resources to a second requestor different than the first requestor;
    receiving, by the virtualization-based resource management system, a utilization request for deploying the application, the utilization request generated by the second requestor, the utilization request including the key provided to the second requestor and the userid of the second requestor;
    responsive to receiving the key, authenticating the key and identifying the allocated set of computing resources based on the key using the stored reserved resource data; and
    responsive to authenticating the key and identifying the allocated set of computing resources based on the key, deploying the allocated set of resources and using the IP address for the deployed application.

2. The method of claim 1, further comprising maintaining the allocated set of computing resources in a reserved state until a release request is received to enable release of the allocated set of computing resources, the release request including the key.

3. The method of claim 1, further comprising returning, to the first requestor, the configuration data corresponding to the allocated set of computing resources.

4. The method of claim 3, further comprising communicating the reserved IP address to the first requestor.

5. The method of claim 1, further comprising, responsive to the first or second requestor placing the allocated set of resources in an inactive state, maintaining the allocated set of resources in a reserved state.

6. The method of claim 1, wherein, if the request did include the key, assigning, by the virtualization-based resource management system, the key included in the request to the allocated set of computing resources, wherein the virtualization-based resource management system assigns a different key to each set of resources that are reserved by the virtualization-based resource management system.

7. The method of claim 1, wherein, if the request did not include the key, randomly generating the key to assign to the allocated set of computing resources.

8. The method of claim 7, further comprising communicating the key to the first requestor.

9. A virtualization-based resource management system, comprising:
   a memory, and
   a processor operable to execute a virtualization-based resource management application stored in the memory, the management application configured to dynamically allocate computing resources, the management application further configured to:
   receive a reservation request generated by a first requestor to reserve a set of computing resources, the reservation request including a userid of the first requestor and a request to reserve an IP address for use by an application to be deployed and hosted by the set of computing resources, the reservation request further including a request to return configuration data corresponding to the set of computing resources to the first requestor, the requested configuration data including the IP address;
   dynamically allocate the set of computing resources to the reservation request; determine whether the request includes a key;
   if the request did not include a key, generate and assign a key to the allocated set of computing resources;
   maintain the allocated set of computing resources in a reserved state;
   receive a utilization request for deploying the application, the utilization request generated by a second requestor different than the first requestor, the utilization request including a userid of the second requestor and the key;
   store the key and the corresponding allocated set of computing resources as reserved resource data;
   provide the key and the corresponding allocated set of computing resources to a second requestor different than the first requestor;
   receive a utilization request for deploying the application, the utilization request generated by the second requestor, the utilization request including the key provided to the second requestor and the userid of the second requestor;
   responsive to receiving the key, authenticate the key and identifying the allocated set of computing resources based on the key using the stored reserved resource data; and
   responsive to authenticating the key and identifying the allocated set of computing resources based on the key, deploy the allocated set of resources and using the IP address for the deployed application.

10. The system of claim 9, wherein the management application is further configured to maintain the allocated set of computing resources in a reserved state until a release request is received to enable release of the allocated set of computing resources, the release request including the key.

11. The system of claim 9, wherein the management application is further configured to return, to the first requestor, the configuration data corresponding to the allocated set of computing resources.

12. The system of claim 11, wherein the management application is configured to communicate the reserved IP address to the first requestor.

13. The system of claim 9, wherein the management application is further configured to, responsive to the first or second requestor placing the allocated set of resources in an inactive state, maintain the allocated set of resources in a reserved state.

14. A computer program product for managing virtualization-based resources, the computer program product comprising:
   a non-transitory computer readable medium having computer readable program code embodied therewith, the computer readable program code comprising computer readable program code configured to:
   receive a reservation request generated by a first requestor to dynamically reserve a set of computing resources, the reservation request including a userid of the first requestor and a request to reserve an IP address for use by an application to be deployed and hosted by the set of computing resources, the reservation request further including a request to return configuration data corresponding to the set of computing resources to the first requestor;
   dynamically allocate the set of computing resources to the reservation request;
   determine whether the request includes a key;
   if the request did not include a key, generate and assign a key to the allocated set of computing resources;
   maintain the allocated set of computing resources in a reserved, unutilized state until a utilization request is received to utilize the allocated set of computing resources;
   store the key and the corresponding allocated set of computing resources as reserved resource data;
   provide the key and the corresponding allocated set of computing resources to a second requestor different than the first requestor;
   receive a utilization request for deploying the application, the utilization request generated by the second requestor, the utilization request including the key provided to the second requestor and the userid of the second requestor;
   responsive to receiving the key, authenticate the key and identify the allocated set of computing resources based on the key using the stored reserved resource data; and
   responsive to authenticating the key and identifying the allocated set of computing resources based on the key, deploy the allocated set of resources and use the IP address for the deployed application.

15. The computer program product of claim 14, wherein the computer readable program code is configured to maintain the allocated set of computing resources in a reserved state until a release request is received to enable release of the allocated set of computing resources, the release request including the key.

16. The computer program product of claim 14, wherein the computer readable program code is configured to, responsive to the first or second requestor placing the allocated set of resources in an inactive state, maintain the allocated set of resources in a reserved state.

17. The computer program product of claim 14, wherein the computer readable program code is configured to return, to the first requestor, the configuration data corresponding to the allocated set of computing resources and the reserved IP address.

* * * * *